Patented Sept. 26, 1950

2,523,848

UNITED STATES PATENT OFFICE 2,523,848

WAX COMPOSITION

August A. Schaerer, Amsterdam, Netherlands, and Karekin Arabian, El Cerrito, Calif., assignors to Shell Development Company, San Francisco, Calif., a corporation of Delaware No Drawing. Application August 2, 1947, Serial No. 765,806

10 Claims. (Cl. 106—270)

This invention relates to novel wax compositions. These compositions are remarkably improved both in having compatibility of their essential components and in being highly water-wettable. These compositions are utilized in the form of blends and also have superior emulsion-forming characteristics.

A wide variety of wax compositions are known and have been used, but in general they do not have sufficient water-wettability combined with compatibility of their essential components. There has long been a search for a wax composition overcoming these defects and having the improvements specified above.

An object, therefore, of the present invention is to provide a wax composition having relatively high water-wettability as a whole and being free of deleterious separation into two or more solid phases, either when present as a solid blend or as a discreet dispersed phase in a suitable fluid medium. Another object is to find a wax composition having homogeneous water-wettability characteristics and the property of retention of single solid phase character and visual homogeneity. This latter property is spoken of herein as compatibility. Another object is to find an improved compatible wax composition which has superior emulsifiable characteristics over those of the wax components.

It has now been discovered that the above and other objects are attained by compositions essentially comprising a predominant amount of one or more hydrocarbon waxes and an amount of between approximately 2 wt. per cent and about 25 wt. per cent (based on the total composition) of a strongly polar hetero atomic organic substance providing the hetero atomic substance and the hydrocarbon waxes differ in chain-length by not more than about six carbon atoms. The difference in chain length is estimated by comparing the closest lengths of the hetero atomic substances and of the hydrocarbon waxes present. For example, a hydrocarbon wax containing waxes of $C_{24}$, $C_{25}$, $C_{26}$ and $C_{27}$ chain length and strongly polar hetero atomic organic substances having $C_{33}$, $C_{34}$, $C_{35}$ and $C_{36}$ chain lengths would meet the indicated requirements, for the $C_{27}$ chain length would be measured relevant to the $C_{33}$ chain length. More than four, for example six, and even more contiguous successive chain lengths of a homologous series may be present in either or both the strongly polar hetero atomic substances and the hydrocarbon wax(es).

Strongly polar hetero atomic organic substances suitable for the present wax blends and present purposes include: particularly long chain amine carboxylate salts, long chain amines, long chain carboxylate esters, and also long chain ketones, aldehydes, long chain amides, long chain alcohols, long chain ethers in which, in any one of these hetero atom-containing polar carbon compounds, there is present a long carbon chain which may vary in length from about fourteen carbon atoms to about sixty carbon atoms, and preferably has a chain within the range of a length of about eighteen to about forty carbon atoms.

Among the suitable strongly polar hetero atomic substances, particularly useful are those compounds which have a plurality of hetero atoms, for example, in such polyhetero-atomic groups as carboxylate ester, thiocarboxylate ester, amide, carbamate, thiocarbamate, dithiocarbamate, sulfonamido, sulfamate, etc. In general, the effective hetero atomic groups applicable in the present hetero atomic substances are hydrophilic and may simply be termed hydrophilic polar hetero atomic groups.

The term of "the two different materials" as used herein and in the appended claims, refers only to such different materials as the hydrocarbon non-polar waxes and the polar hetero atomic organic substances.

The present discoveries may be summarized in a preferred sense by the statement that highly improved water-wettable wax compositions which retain the homogeneity of a single solid phase composition are formed by blending together between about 75 wt. per cent and about 98 wt. per cent of a hydrocarbon wax and the rest (i. e. between about 25 wt. per cent and about 2 wt. per cent) of a strongly polar hetero atomic organic substance having the general formula of a long chain carboxylate ester, a long-chain amine, or a long chain amine carboxylate salt, or mixtures of these hetero atomic substances wherein the closest chain lengths of the hetero atomic substance and of the hydrocarbon wax differ by not more than about six carbon atoms. The closest chain-lengths of the waxes and of the hetero substances should comprise at least approximately 10% by weight of each of the respective two different materials. Most preferred are blends in which the average chain length on a weighted basis of the hetero atomic substance portion and of the hydrocarbon wax portion differ by not more than about six carbon atoms. More particularly, relatively best results are obtained with the above-specified blends when the carboxylate ester, the amine, and/or the amine carboxylate salt is present in an amount of between about 5 wt. per cent and about 15 wt. per cent of the total wax in the blend.

The carboxylate esters suitable for this invention consist of any of the conventionally known carboxylate esters having a carbon chain-length of at least about fourteen carbon atoms. Examples of these suitable esters are: methyl palmitate, ethyl oleate, ethyl stearate, and the butyl, hexyl, octyl, undecyl, dodecyl, hexadecyl, octadecyl, and higher alkyl esters of stearate and near homologs and analogs of higher fatty acid carboxylate anions; also suitable esters are long alkyl-chain esters of the lower fatty acids such as octadecyl acetate, $C_{20}$ and higher alkyl esters of acetate, propionate, butyrate, caprate, and like anions so long as the total carbon chain-length in the chain of these esters per molecule amounts to at least about fourteen and preferably above about eighteen carbon atoms.

The long chain amines suitable for this invention consist of any conventionally known amines having a carbon chain-length of at least about fourteen, and preferably at least about eighteen carbon atoms. These amines may be primary and/or secondary or tertiary; when tertiary, preferably the third organic group is below about eight carbons in length so that the amine is substantially a linear chain for the most part. Examples of these suitable amines are: methyl oleyl amine, methyl hexadecyl amine, ethyl octadecyl amine, butyl $C_{24}$-alkylamine, bis-octadecyl amine, mono-octadecyl amine, $C_{26}$-alkyl amine, $C_{30}$-alkyl amine, bis-octadecyl methyl amine, bis-$C_{20}$-alkyl isopropyl amine, $C_{36}$-alkyl amine.

The amine carboxylate salts suitable for this invention consist of any conventionally known or producible amine carboxylate salts having a carbon chain length of at least about fourteen and preferably of at least about eighteen carbon atoms. Examples of these suitable amine salts are: methyl amine octadecyl carboxylate, isopropyl amine palmitate, octyl amine stearate, dodecyl amine oleate, dodecyl amine dodecyl carboxylate, octadecyl amine stearate. The corresponding secondary amine salts of the carboxylates may also be used, or the tertiary amine salts; when the tertiary are used, preferably the third organic group is below about eight carbon atoms in length. Long chain amine salts of the lower carboxylates are also suitable, for example, octadecyl amine acetate, $C_{25}$-alkyl amine propionate, $C_{36}$-alkyl amine hexoate, and similar amine salts. In the case of the employment of the above long chain amine carboxylate salts, and long chain carboxylate esters in this invention, best results are obtained with said carboxylate polar compounds in which a carbon chain of at least 14 carbon atoms is connected to the carbon atom of the carboxylate group.

The hydrocarbon waxes suitable for this invention consist of any hydrocarbon waxes produced from petroleum or by organic synthesis which have a melting point of at least about 30° C. and preferably a melting point above about 45° C. These waxes are well-known to the published literature and to those skilled in the art and require no description here.

Either straight-chain waxes or the isomeric non-straight-chain waxes, or mixtures of these may be employed as the essential hydrocarbon wax portion of the present compositions. The amount of straight-chain wax and/or its isomers employed will depend upon their well-known properties such as flexibility, tensile strength, tack, hardness, melting point, and so forth which it is desired in these respects to impart to the finished composition with the hetero atomic substances of this invention. The term "amorphous petroleum wax" or "amorphous hydrocarbon wax" includes not only the isomeric amorphous waxes per se, but also mixtures containing waxes having sufficient branching and/or cycloaliphatic groups so that the wax fraction has the well-known amorphous character.

The present compositions are eminently suitable as improved wax blends because they improve on the properties of the hydrocarbon waxes without substantially detracting from the latter's desired properties. The strongly polar hetero atomic substances cannot be used in more than about 25 wt. per cent content in the present blends because then the properties of the hetero atomic substances begin to show up too much in the blend. The undesired properties of the hetero atomic substances which makes them unsuitable for the present purposes when used in too large proportions comprise: relatively no adhesion to surfaces of various solid objects such as metal, wood, cloth, cheese, etc.; substantially no tack; inability to dissolve hydrocarbon oils for the conventional uses to which a solution of oil in wax is put; too brittle for use; incapability of forming a continuous film on a surface to which they are applied from a hot melt or from an emulsion.

The chief contributions to the art of the present invention include: an extremely simple and ingenious composition whereby substantially non-emulsifiable or at least poorly emulsifiable hydrocarbon waxes become or are rendered capable of forming finely divided long-lasting or relatively permanent aqueous emulsions or suspensions. In fact, if on extremely long standing, aqueous emulsions formed by conventional means but from the present compositions of hetero atomic substances blended with hydrocarbon wax show separation of the wax phase from the water (known as creaming), then they are readily restored to a smooth consistency and the usual desired emulsified dispersion by simply shaking. This is not true of attempted emulsified dispersions tried with hydrocarbon waxes alone in water or with them containing less than about 2 wt. per cent of the present strongly polar hetero atomic organic substances. In these latter cases no satisfactory emulsion appears capable of being formed.

The emulsions which it is now possible to form from the present compositions provide a new answer to the search for stable aqueous wax emulsions. The emulsified form of this invention's wax blends are eminently useful for the usual conventional applications of the other but less desirable wax emulsions in the fields of waxing either painted or unpainted steel surfaces, waxing of floors, furniture; also impregnation and/or coating of paper, and use in introducing wax into rubber, into synthetic elastomers, and in introducing wax as a softening plasticizer into many conventional organic plastic preparations. The marked improvement which the present wax blends afford is the unusual finely divided state and relative uniformity of dispersion throughout the emulsion's continuous phase which is maintained during conditions of the above uses. All of this depends on the fact that the present blends of the specified waxes have as a whole a greatly reduced contact angle with water and a ready wettability while affording and even retaining substantially complete compatibility. This is true even though the hydrocarbon waxes are predominant in amount (at least more than about 25 wt. per cent in the wax blend).

These properties, especially in view of the predominant amount of hydrocarbon wax, are certainly not obvious. Above about 25 wt. per cent content of the hetero atomic substance, blends of hydrocarbon wax therewith become unsuitable for the present purposes. The use of the hetero atomic substances alone as attempted emulsions is also unsuitable because these hetero atomic substances have substantially none of the desired and needed characteristics of a wax for the present purposes.

A feature of the instant wax blends is that they behave as a single homogenous wax material. For instance, these blends deposit from a hot melt onto the surface of a solid object forming a continuous film or coating; on standing it remains homogeneous, and does not check or peel off spontaneously.

The present blends are also useful in enamels used as automobile paints; therein these blends prevent rippling. The present wax blends can be employed as a molding or casting wax in making up conventional mock-ups or models of articles that are going to be cast. The instant wax blends are advantageous here because they permit the wax surface of the model to be wet sufficiently by aqueous dispersions of plaster of Paris used conventionally for the wax casting operation. On the other hand, hydrocarbon waxes used in this operation are too hydrophobic and there are many objections to the inability to get such a hydrocarbon molding wax wetted with the aqueous dispersion of plaster of Paris.

Additives which are conventionally employed in wax compositions may be mixed into the particular wax compositions of the present invention. Thus, powdered graphite, corrosion-inhibiting additives such as amine nitrites (dicyclohexylamine nitrite), organic dyes, and pigments may be incorporated.

For purposes of further illustration, reference will now be made to the following examples, it being understood that there is no intention of being limited to the specific details disclosed therein. All parts specified in the following examples are parts by weight.

Ten parts of n-octadecyl stearate ester containing 36 carbon atoms was blended into ninety parts of a predominantly straight-chain hydrocarbon wax having an average chain length of 30 carbon atoms, by stirring into a melt of the latter. The resultant blend, upon solidifying and standing, showed no separation into two layers and presented a homogeneous appearance in cross-section throughout.

Ten parts of bis-octadecyl-amine and of mono-octadecyl amine stearate were each blended separately into ninety parts of a predominantly straight-chain hydrocarbon wax having an average chain length of 30 carbon atoms, in the manner of the above example. Each of the resultant blends, upon solidifying and standing, showed no separation into discreet phases and presented a homogeneous appearance in cross-section throughout. However, when ten parts of mono-octadecyl amine and of octadecyl succinic anhydride were each blended separately into ninety parts of the same hydrocarbon wax used in the above examples, and in the manner thereof, each of the resultant blends, upon solidifying showed clearly evident separation into two discreet solid phases and a definitely non-homogeneous appearance in cross-section.

The compatible blends formed as described above were shown to impart a hydrophilic or water-wettable character to the blend as a whole because it was found that water formed significantly decreased angles of contact upon the surfaces of these wax blends, respectively, than upon the hydrocarbon waxes. These blends were also demonstrated to form satisfactory stable emulsions in water, whereas either of the components alone did not.

We claim as our invention:

1. An improved water-wettable emulsifiable wax composition having a single phase structure, which composition comprises essentially a hydrocarbon wax and a long chain carboxylate ester of a fatty acid and a fatty alcohol in an amount between about 2 wt. per cent and about 25 wt. per cent of total wax present wherein the two different materials differ by not more than about six carbon atoms in average carbon chain length.

2. An improved water-wettable emulsifiable wax composition having a single phase structure, which composition comprises a hydrocarbon wax and a long chain carboxylate ester of a fatty acid and a fatty alcohol in an amount between about 2 wt. per cent and about 25 wt. per cent of total wax present, wherein the closest chain lengths of the two different materials differ by not more than about six carbon atoms in chain length and comprise at least about 10 wt. per cent of the respective materials.

3. An improved water-wettable emulsifiable wax composition having a single phase structure, which composition comprises essentially a hydrocarbon wax and a long chain carboxylate ester of a fatty acid and a fatty alcohol in an amount between about 5 wt. per cent and about 15 wt. per cent of total wax present wherein the two different materials differ by not more than about six carbon atoms in average carbon chain length.

4. An improved water-wettable emulsifiable wax composition having a single phase structure, which composition comprises essentially an amorphous hydrocarbon wax having an average chain length of thirty carbon atoms and octadecyl stearate in an amount of approximately 10 wt. per cent of total wax present, said wax thereby differing from the octadecyl stearate by not more than about six carbon atoms in carbon chain length.

5. An improved water-wettable emulsifiable wax composition having a single phase structure, which composition comprises essentially an amorphous hydrocarbon wax and octadecyl stearate in an amount between about 5 wt. per cent and about 15 wt. per cent of total wax present wherein said octadecyl stearate and the amorphous hydrocarbon wax differ by not more than about six carbon atoms in average carbon chain length.

6. An improved water-wettable emulsifiable wax composition having a single phase structure, which composition comprises essentially a hydrocarbon wax and octadecyl stearate in an amount between about 5 wt. per cent and about 15 wt. per cent of total wax present and wherein said octadecyl stearate and the hydrocarbon wax differ by not more than about six carbon atoms in average carbon chain length.

7. An improved water-wettable emulsifiable wax composition according to claim 1, which composition comprises essentially a hydrocarbon wax and hexadecyl stearate in an amount between about 2 weight per cent and about 25 weight per cent of total wax present, wherein the wax and stearate differ by not more than about six carbon atoms in average carbon chain length.

8. An improved water-wettable emulsifiable wax composition according to claim 1, which composition comprises essentially a hydrocarbon wax and octadecyl acetate in an amount between about 2 weight per cent and about 25 weight per cent to total wax present, wherein the wax and acetate differ by not more than about six carbon atoms in average carbon chain length.

9. An improved water-wettable emulsifiable wax composition according to claim 1, which composition comprises essentially a hydrocarbon wax and ethyl oleate in an amount between about 2 weight per cent and about 25 weight per cent to total wax present, wherein the wax and oleate differ by not more than about six carbon atoms in average carbon chain length.

10. An improved water-wettable emulsifiable wax composition according to claim 1, which composition comprises essentially a hydrocarbon wax and butyl stearate in an amount between about 2 weight per cent and about 25 weight per cent to total wax present, wherein the wax and stearate differ by not more than about six carbon atoms in average carbon chain length.

AUGUST A. SCHAERER.
KAREKIN ARABIAN.

REFERENCES CITED

The following references are of record in the file of this patent:

UNITED STATES PATENTS

| Number | Name | Date |
|---|---|---|
| 2,244,705 | Hutchinson et al. | June 10, 1941 |
| 2,322,198 | Parsons | June 15, 1943 |
| 2,342,520 | Stickdorn | Feb. 22, 1944 |
| 2,344,016 | Anderson | Mar. 14, 1944 |
| 2,367,712 | Bradley | Jan. 23, 1945 |
| 2,371,289 | Hamilton et al. | Mar. 13, 1945 |
| 2,385,849 | Snell et al. | Oct. 2, 1945 |
| 2,387,157 | Koppenhoefer | Oct. 16, 1945 |
| 2,427,255 | Burrell et al. | Sept. 9, 1947 |

FOREIGN PATENTS

| Number | Country | Date |
|---|---|---|
| 468,533 | Great Britain | July 7, 1937 |